US007643169B2

(12) United States Patent
Tominaga

(10) Patent No.: US 7,643,169 B2
(45) Date of Patent: Jan. 5, 2010

(54) OBSERVING A STATE OF A DIGITAL SIGNAL AND CAPTURING THE DIGITAL SIGNAL

(75) Inventor: Hidekazu Tominaga, Shizuoka-ken (JP)

(73) Assignee: Canon Kabushiki Kaisha, Tokyo (JP)

(*) Notice: Subject to any disclaimer, the term of this patent is extended or adjusted under 35 U.S.C. 154(b) by 138 days.

(21) Appl. No.: 11/700,162

(22) Filed: Jan. 31, 2007

(65) Prior Publication Data
US 2007/0127086 A1 Jun. 7, 2007

Related U.S. Application Data

(62) Division of application No. 09/791,547, filed on Feb. 26, 2001, now Pat. No. 7,310,170.

(30) Foreign Application Priority Data

Feb. 28, 2000 (JP) ............................ 2000-051276
Feb. 21, 2001 (JP) ............................ 2001-045340

(51) Int. Cl.
G06F 3/12 (2006.01)
H04N 1/38 (2006.01)

(52) U.S. Cl. ..................................... 358/1.15; 358/463

(58) Field of Classification Search ................ 358/1.15, 358/3.26, 463, 448, 466, 1.2, 1.5, 1.6, 1.9; 702/191; 326/21; 327/310, 379; 340/538.12; 379/227; 455/501; 347/2, 3, 5, 14, 23; 399/1, 399/2, 8
See application file for complete search history.

(56) References Cited

U.S. PATENT DOCUMENTS

| 4,517,531 | A | * | 5/1985 | Tan et al. | ........................ 331/14 |
| 4,733,310 | A |   | 3/1988 | Kapp et al. | .................. 358/300 |
| 4,783,827 | A | * | 11/1988 | Izumi | .......................... 382/194 |
| 4,839,908 | A |   | 6/1989 | Takayama | ................... 375/351 |
| 6,087,864 | A | * | 7/2000 | Aoki | ........................... 327/116 |
| 6,275,550 | B1 | * | 8/2001 | Fukuda | ....................... 375/357 |

FOREIGN PATENT DOCUMENTS

| JP | 53-142157 | 12/1978 |
| JP | 58-205327 | 11/1983 |

* cited by examiner

Primary Examiner—Dov Popovici
(74) Attorney, Agent, or Firm—Fitzpatrick, Cella, Harper & Scinto

(57) ABSTRACT

A sampling unit samples plural input signals, and detects a point (change point) at which one of the sampled input signals shows a change in the logic level. In case the logic level after the detection of the change point continues for a predetermined time, the plural sampled data are respectively latched or outputted after the lapse of the predetermined time, and, in any other timing, the sampled data are held, thereby obtaining plural noise-eliminated signals. One of the plural input signals is a clock signal, and, in case of data transmission in synchronization with such clock signal, the transmission is executed with a timing synchronized with the noise-eliminated signal. The predetermined time is selected equal to or less than ¼ of the cycle period of the communication synchronization clock signal.

6 Claims, 14 Drawing Sheets

OBSERVING A STATE OF A DIGITAL SIGNAL AND CAPTURING THE DIGITAL SIGNAL

This application is a divisional of application Ser. No. 09/791,547, filed Feb. 26, 2001, the contents of which are incorporated by reference herein.

BACKGROUND OF THE INVENTION

1. Field of the Invention

The present invention relates to a communication apparatus, a communication method, an image forming apparatus utilizing the same, a unit connected to the image forming apparatus and an image forming system.

2. Related Background Art

At first there will be briefly explained a noise elimination apparatus utilizing a digital noise filter of digital input. As disclosed for example in Japanese Patent Application Laid-Open No. 58-205327, there is already known a noise elimination apparatus utilizing a digital noise filter, in which the state of the input signal is monitored plural times at a predetermined time interval, and the state of the signal is captured only when, after a change in the state of the signal, the changed state continues for a predetermined time. Also there is disclosed, for example in Japanese Patent Application Laid-Open No. 53-142157, a noise elimination apparatus with a variable digital noise filter capable of arbitrarily setting the observation time for the continuation of the state of the signal after the change thereof. The variable digital noise filter is advantageous in that the time not sensing the noise can be arbitrarily set according to the magnitude and time of the noise to be eliminated. It is effective in case the noise situation is not clear in the location where the noise elimination apparatus is to be installed or in case the noise situation changes from time to time.

FIG. 10 is a block diagram showing an example of the noise elimination apparatus utilizing the variable digital noise filter. A noise elimination unit 114 is provided with a sampling unit 108 for sampling an input signal at the timing of an input reference clock, a change point detection unit 109 for detecting a point of change to a low logic level if the logic level prior to the point of observation is high, or to a high logic level if the logic level prior to the point of observation is low, and a same level continuation observation unit 110 for observing whether the changed logic level continues for a predetermined time after the change point is detected by the change point detection unit 110. The same level continuation observation unit 110 observes, in case the logic level changes from high to low, whether the low logic level continues for a predetermined time after the state change thereto, or, in case the logic level changes from low to high, whether the high logic level continues for a predetermined time after the state change thereto. It is thus rendered possible to identify whether the aforementioned change of the logic level has resulted from an actual signal or from a noise, because the noise shows rapid repetitions of high and low logic levels and cannot maintain, for the predetermined time, the changed logic level after the change thereof.

The noise elimination unit is further provided with a same level continuation observation time setting unit 111 for setting or changing the predetermined time for observing the same level continuation observation unit 110. Such unit allows to set an appropriate predetermined time in another system with a different reference clock or with a different noise environment, thereby achieving noise elimination more effectively. The noise elimination unit 114 is further provided with a data capture timing generation unit 112 for determining the timing of capturing the input signal in response to the result of the same level continuation observation unit 110, and a latch/hold unit 113 for latching or holding the actually sampled input signal in response to the result of the data capture timing generation unit 112. In case the input signal, after the change thereof, maintains a same logic level for the predetermined time, the latch/hold unit 113 latches the sampling data as effective data, after the lapse of the predetermined time. Otherwise it holds the data of its own by feedback of such data. It is thus rendered possible to prevent easy entry of the noise into the circuit.

FIG. 11 shows an example of an image forming apparatus capable of two-sided printing. An image forming apparatus 200, capable of two-sided printing by mounting a two-sided unit 168, is provided with a scanner unit 161, a photosensitive member 162 to be exposed to a laser unit emitted from the scanner unit 161, a developing unit 163 for developing a latent image formed by exposure on the photosensitive member 162, a transfer belt 165 for transferring an image onto a recording sheet 164, a fixing unit 166 for fixing the transferred image to the recording sheet 164, a cassette 167 holding a stack of the recording sheets 164, and an engine control unit 101 (to be explained later) for controlling these component units. Also the two-sided unit 168 for enabling two-sided printing on the recording sheet 164 is provided with a two-sided control unit 169 (to be explained later) for controlling such two-sided unit 168.

FIG. 12 is a block diagram showing connection of the engine control unit 101 and the two-sided unit control unit 169 by bidirectional clock-synchronized serial communication. Each of the engine control unit 101 and the two-sided unit control unit 169 emits and receives various unrepresented signals, and the engine control and the two-sided unit control are achieved by monitoring the states of these input signals. (In FIG. 12, there are only shown a communication synchronization clock CLK, transmission data TxD and reception data RxD.) In case a two-sided printing is instructed, the engine control unit 101 and the two-sided unit control unit 169 execute serial communication to share the controls whereby the two-sided unit control unit 169 controls the two-sided unit 168 while the engine control unit 101 controls other components. The engine control unit 101 is provided with a master CPU 102 including a serial communication unit 103 for executing clock synchronized communication with the two-sided unit control unit 169, while the two-sided unit control unit 169 is provided with a slave CPU 105 including a serial communication unit 106 for executing clock synchronized communication with the engine control unit 101.

In the following there will be explained, with reference to FIGS. 13A and 13B, a communication method of exchanging command and status by the serial communication unit 103 of the master CPU 102 and the serial communication unit 106 of the slave CPU 103.

FIG. 13A is a view showing the relationship between clock signal and data in the bidirectional clock synchronized communication. In synchronization with the downshift of a clock signal transmitted by the master CPU 102, the data transmitting side transmits data of 8 bits, from the LSB (least significant bit) to the MSB (most significant bit). On the other hand, in synchronization with the upshift of the clock signal transmitted by the master CPU 102, the receiving side receives the data of 8 bits from the LSB (least significant bit) to the MSB (most significant bit).

FIG. 13B is a timing chart showing the state of communication between the master CPU 102 and the slave CPU 105. In FIG. 13B, CLK, TxD and RxD are names from the side of the master CPU 102, and respectively indicate a communication synchronization clock, transmission data and reception data. At first, in synchronization with the downshift of the communication synchronization clock, the master CPU 102 transmits the transmission data TxD. Based on the SLK and TxD transmitted from the master CPU 102, the slave CPU 105 receives the reception data of 8 bits in synchronization with the upshift of the communication. synchronization clock. Then the slave CPU 105 transmits the transmission data of 8 bits in synchronization with the downshift of the communication synchronization clock. The transmission data from the slave CPU 105 are the reception data RxD seen from the master CPU 102, which thus receives the reception data of 8 bits in synchronization with the upshift of the communication synchronization clock. In this manner the transmission data TxD and the reception data RxD are emitted and received in synchronization with the communication synchronization clock emitted by the master CPU 102. The engine control unit 101 and the two-sided unit control unit 169 are respectively provided with unrepresented input units for plural input signals, and an above-described noise elimination apparatus is required for such input unit in order not to capture erroneous digital data. Particularly in the bidirectional clock synchronized serial communication, if a noise is superposed on the communication synchronization clock signal, the slave side which receives the data in synchronization with the communication synchronization clock executes the data capture at a wrong timing, resulting in frequency reception errors. Also the reception data will involve a reception error if a noise is generated at the upshift of the communication synchronization clock. Similarly, also in the master side, there will result a reception error if a noise is generated at the upshift of the communication synchronization clock.

Thus, in the clock synchronized serial communication, a transmission error or a reception error will result in the data if a noise is superposed on the communication synchronization clock or on the transmission or reception data. Particularly if a noise is superposed on the communication synchronization clock signal, the slave side which receives the data in synchronization with the communication synchronization clock executes the data capture at a wrong timing, resulting infrequency reception errors. Also the reception data will involve a reception error if a noise is generated at the upshift of the communication synchronization clock.

In the clock-synchronized serial communication, as the receiving side often recognizes erroneous data because of the noise, there has been adopted a measure as shown in FIG. 15. More specifically, in such measure, a low-pass filter consisting of a resistor 51 and a capacitor 52 is provided on each line connecting the engine control unit 101 and the two-sided unit control unit 169. Such low-pass filter has a cutoff frequency fc=1/(2πRC) and can attenuate and eliminate the noise of a frequency higher than such cutoff frequency.

In case the noise elimination apparatus of the variable digital noise filter type is provided on each of the input units for the plural digital inputs, as shown in FIG. 14, there will be required, corresponding to the number of the input units, the variable timing generation units for observing the state of the input signal plural times at a predetermined time interval and capturing the signal only if, after the change in the state of the signal, the changed state continues for a predetermined time, whereby the magnitude of circuitry becomes inevitably large.

Also in case data signal is transmitted from the slave side in synchronization with the clock signal outputted from the master side as in the bidirectional clock synchronized serial communication, the delay in time is accumulated, in the course of communication, by the forward signal (clock signal) and the returns signal (data signal), whereby the timing of receiving the data signal at the master side may be perturbed. Consequently, in case a delay in the communication is possible, the noise elimination apparatus of the variable digital noise filter type cannot be installed, so that the digital noise filter of high noise eliminating effect cannot be adopted. Stated differently, the conventional noise elimination apparatus of the variable digital noise filter type as shown in FIG. 10 has a wide application because the aforementioned predetermined time can be selected according to the desired level of noise elimination, but, because the aforementioned predetermined time can be arbitrarily selected, the reception timing for the data signal at the master side may be perturbed if such time is selected excessively large. For this reason, the variable digital noise filter has not been employed in practice, and the noise elimination has been achieved by the analog filter of a predetermined cutoff frequency fc as shown in FIG. 15. The cutoff frequency fc is determined as 1/2πRC by a preset resistor R and a preset capacitor C, whereby the noises of higher frequencies are eliminated by attenuation.

SUMMARY OF THE INVENTION

An object of the present invention is to remove the above-described drawbacks.

Another object of the present invention is to provide a communication apparatus, a communication method, an image forming apparatus utilizing such method, a unit connected to the image forming apparatus and an image forming system, capable of securely achieving noise elimination in the digital signal without increasing the magnitude of the circuitry.

Still another object of the present invention is to provide a communication apparatus, a communication method, an image forming apparatus utilizing such method, a unit connected to the image forming apparatus and an image forming system, capable, in case of data transmission in synchronization with a clock signal transmitted from a partner, of securely transmitting the signal to be transmitted even if a noise is superposed on the clock signal, without increasing the magnitude of the circuitry.

The above-mentioned objects can be attained, according to the present invention, by a communication apparatus comprising:

a first input means for inputting a first digital signal;

a second input means for inputting a second digital signal synchronized with the first digital signal;

an observation means for observing the state of the first digital signal;

a first digital signal capture means for capturing the first digital signal, in case the state of the first digital signal changes, according to the state of the first digital signal for a predetermined time thereafter; and a second digital signal capture means for capturing the second digital signal at the capture timing of the first digital signal by the first digital signal capture means.

Preferably the first digital signal is a clock signal, and the second digital signal is a data signal transmitted in synchronization with the clock signal. Also preferably the communication apparatus further comprises setting means for variably setting the aforementioned predetermined time.

Also according to the present invention, there is provided an image forming apparatus provided with the above-described communication apparatus for communicating with a unit connected to the image forming apparatus. Also according to the present invention, there is provided a unit connected to an image forming apparatus and provided with the above-described communication apparatus for communicating with the image forming apparatus. Also according to the present invention, there is provided an image forming system which includes an image forming apparatus and a unit connected thereto and in which at least either of the image forming apparatus and the unit is provided with the above-described communication apparatus for executing communication between the image forming apparatus and the unit. Preferably the aforementioned unit is at least one of a two-sided unit, and an MPT (multipurpose tray) and an envelope feeder, and the image forming apparatus communicates with a unit or with plural units.

Also according to the present invention, there is provided a communication method in a communication apparatus including first input means for inputting a first digital signal and second input means for inputting a second digital signal synchronized with the first digital signal, the method comprising:

an observation step of observing the state of the first digital signal;

a first digital signal capture step of capturing the first digital signal, in case the state of the first digital signal changes, according to the state of the first digital signal for a predetermined time thereafter; and a second digital signal capture step of capturing the second digital signal at the capture timing of the first digital signal by the first digital signal capture step.

Preferably the first digital signal is a clock signal and the second digital signal is a data signal transmitted in synchronization with the clock signal.

According to the present invention, there is provided another communication apparatus capable of transmitting a data signal in synchronization with an input clock signal, the apparatus comprising:

a clock signal input means for inputting a clock signal;

a data signal transmission means for transmitting a data signal;

an observation means for observing the state of the clock signal; and a clock signal capture means for capturing the clock signal, in case the state of the clock signal changes, based on the state of the clock signal for a predetermined time thereafter.

Wherein the data signal transmission means transmits the data signal in synchronization with the clock signal captured by the clock signal capture means.

Preferably the aforementioned predetermined time is at least selected not exceeding ¼ of the cycle period of the clock signal. Also preferably the communication apparatus further comprises setting means for variably setting the aforementioned predetermined time.

Also according to the present invention, there is provided an image forming apparatus provided with the above-described communication apparatus for communicating with a unit connected to the image forming apparatus. Also according to the present invention, there is provided a unit connected to an image forming apparatus and provided with the above-described communication apparatus for communicating with the image forming apparatus. Also according to the present invention, there is provided an image forming system which includes an image forming apparatus and a unit connected thereto and in which at least either of the image forming apparatus and the unit is provided with the above-described communication apparatus for executing communication between the image forming apparatus and the unit. Preferably the aforementioned unit is at least one of a two-sided unit, an MPT and an envelope feeder, and the image forming apparatus communicates with a unit or with plural units.

Also according to the present invention, there is provided another communication method for use in a communication apparatus including digital signal input means for inputting a digital signal and data signal transmission means for transmitting a data signal, the method comprising:

an observation step of observing the state of the aforementioned first digital signal;

a clock signal capture step of capturing the clock signal, in case the state of the clock signal changes, based on the state of the clock signal for a predetermined time thereafter; and a data signal transmission step of transmitting the data signal in synchronization with the clock signal captured in the clock signal capture step.

Preferably the communication method further comprises a data signal transmission step of transmitting the data signal in synchronization with the clock signal captured in the clock signal capture step.

Preferably the aforementioned predetermined time is at least selected not exceeding ¼ of the cycle period of the clock signal.

Still other objects of the present invention, and the features thereof, will become fully apparent from the following description to be taken in conjunction with the accompanying drawings.

DESCRIPTION OF THE PREFERRED EMBODIMENTS

Now the present invention will be clarified in detail by preferred embodiments thereof, with reference to the accompanying drawings.

First Embodiment

Figure 1:
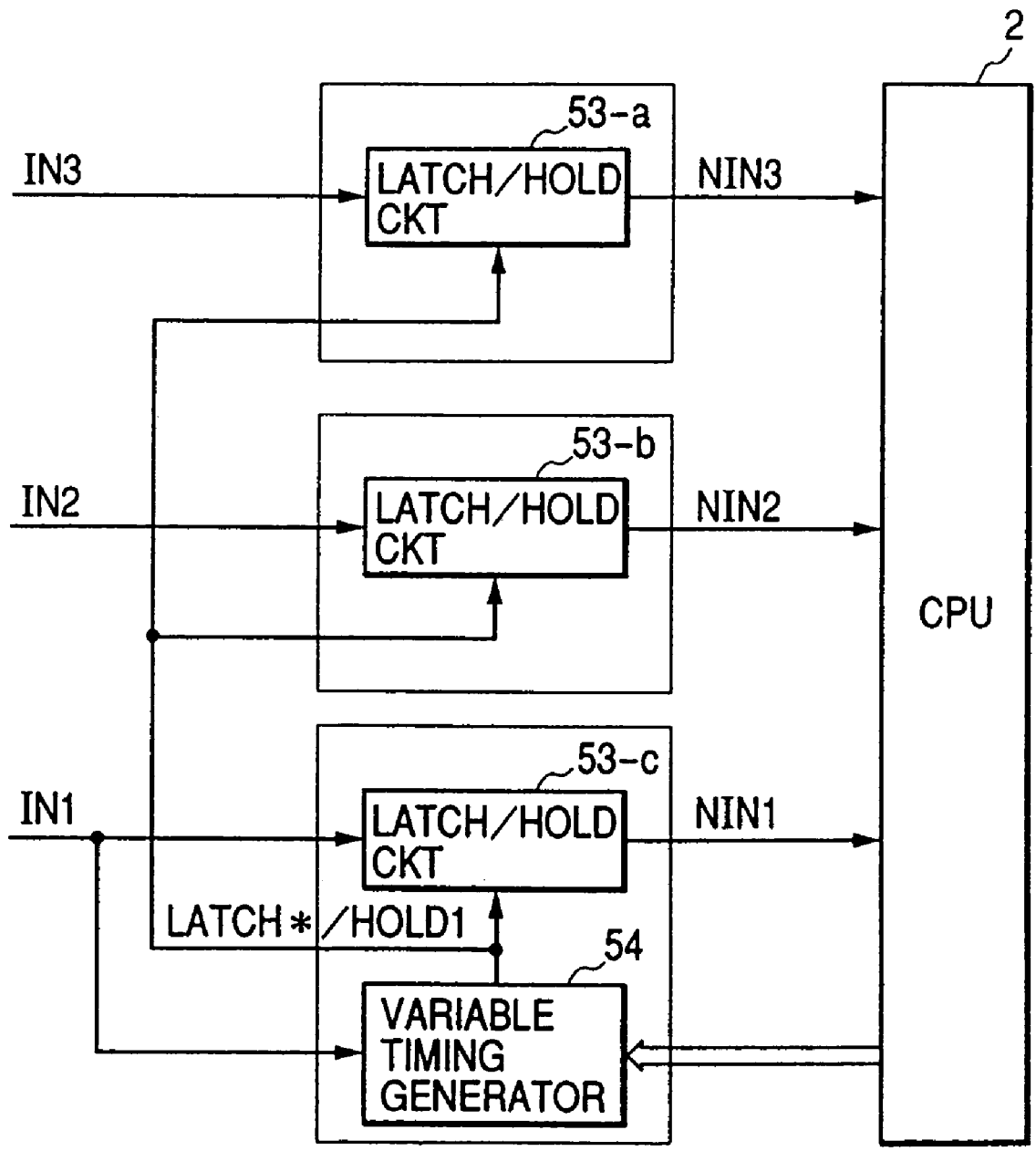
FIG. 1 is a view showing an example of the configuration of a variable digital noise filter embodying the present invention.

FIG. 1 shows an example of the configuration in which the present invention is applied to a communication apparatus provided with plural input units.

In the present embodiment, there will be explained a case in which three input signals, namely input 1 (IN1), input 2 (IN2) and input 3 (IN3), are input into a CPU 2. These input signals are input into the CPU 2 after noise elimination respectively by latch/hold circuits 53-a, 53-b, 53-c. A variable timing generator 54 observes whether the state of the digital data of IN1 is maintained for a predetermined time after a change in the state, and generates a timing signal after the lapse of the predetermined time. In the variable timing generator 54, the predetermined continuation observation time can be arbitrarily set from the CPU 2. The output of the variable timing generator 54 is used as control signals for the latch/hold circuits 53-a, 53-b, 53-c for IN1, IN2, IN3.

The input frequencies of these input signals are in the order of IN3<IN2<IN1, thus being highest in the signal IN1. Also the change points of the digital data IN2 and IN3 are included in the change point of the digital data IN1. In such case, according to the present invention, the latch/hold 1 control signal (LATCH*/HOLD1) outputted from the variable timing generator 54 is a control signal generated by the signal IN1 and is also used as the latch/hold control signals for the inputs IN2 and IN3.

Figure 2:
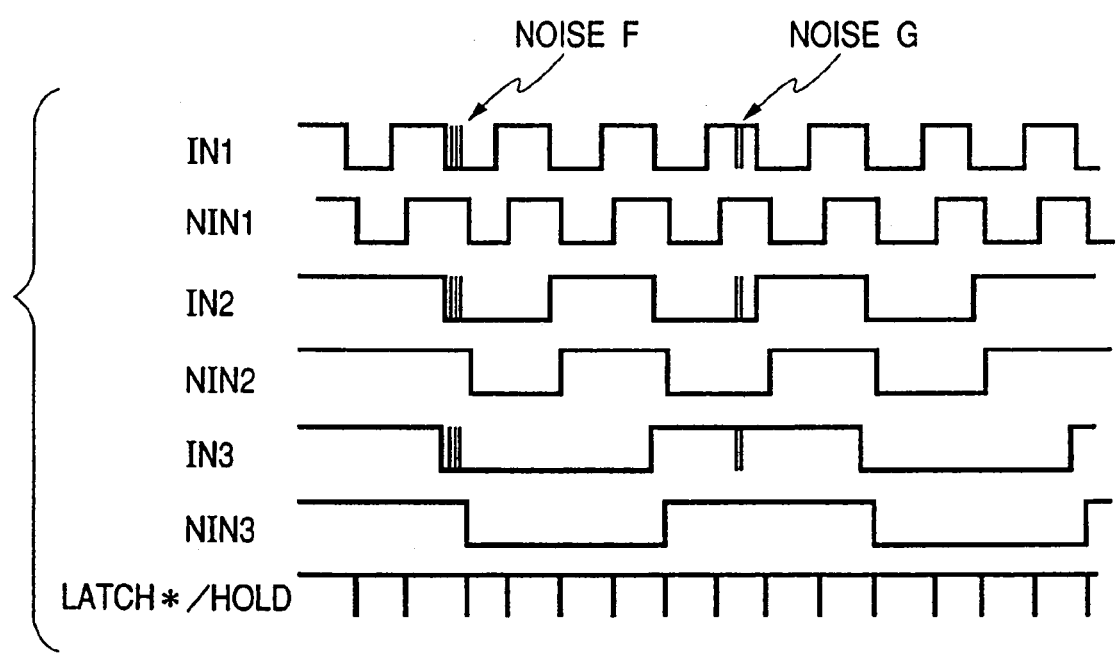
FIG. 2 is a view showing the relationship between plural input signals superposed with noises F and G, and the plural input signals after the elimination of the noises.

Now reference is made to FIG. 2 for explaining in detail the function of noise elimination according to the present invention. FIG. 2 shows a case where noises F and G are superposed. The noises F and G are superposed similarly on the signals IN1, IN2 and IN3 if they are assumed to have a same input path. In case the signal IN1 is superposed with the noises as shown in FIG. 2, the control signal of the variable timing generator 54 assumes a state indicated by LATCH*/HOLD1 shown in FIG. 2. Therefore, after the change point of the digital signal IN1 in the absence of the noise F or G, the data is captured after the lapse of the predetermined time, so that the LATCH*/HOLD1 signal assumes the low level state. In the presence of the noise F, the data is captured after the lapse of the predetermined time from the end of the noise F, so that the LATCH*/HOLD1 signal assumes the low level state. Also in the presence of the noise G, the digital signal IN1 is disregarded as it does not maintain a same state for the predetermined time after the change of the state. The LATCH*/HOLD1 signal thus prepared from the signal IN1 is used for obtaining a noise-eliminated input signal NIN1 (New IN1), which is input into the CPU 2.

The LATCH*/HOLD1 signal is also used as a control signal for noise elimination of the signals IN2 and IN3. The frequencies of the signals IN2, IN3 are lower than that of the signal IN1, and the change points of the digital data IN2, IN3 are contained in those of the digital data IN1. Therefore the LATCH*/HOLD1 signal allows to latch the digital data without missing the change points of the digital data IN2 and IN3, thereby achieving noise elimination. According to the present invention, the variable timing generator 54 need not be provided on each of the input units for the plural digital input signals, whereby the circuitry can be made smaller.

Second Embodiment

Figure 3:
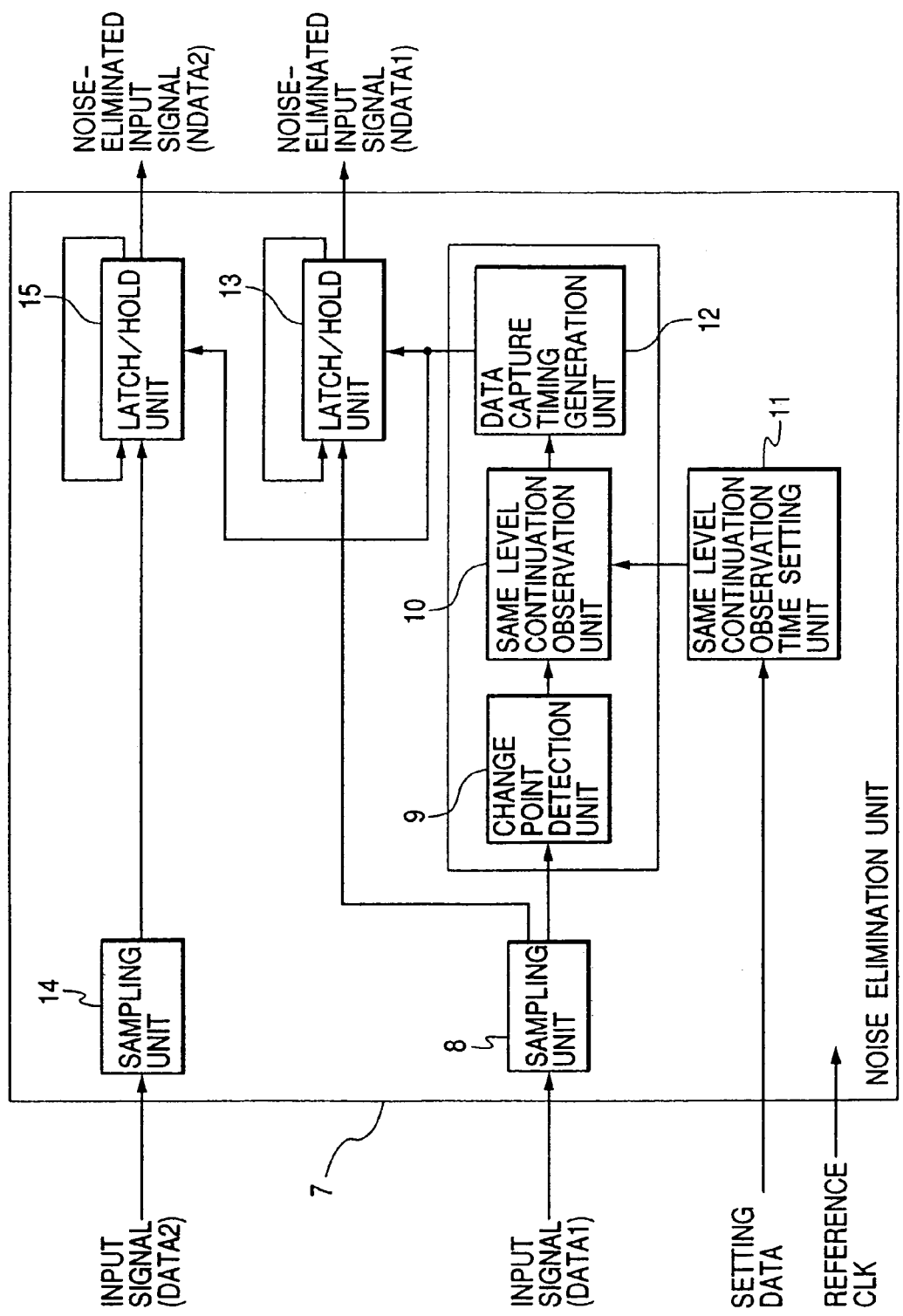
FIG. 3 is a block diagram showing the configuration of a noise elimination unit 7.

FIG. 3 is a block diagram showing an example of the configuration of an embodiment 2 applicable for example to the slave side of a clock synchronized serial communication apparatus.

A noise elimination unit 7 is provided with a sampling unit 8 for sampling an input signal DATA1 with the timing of an input reference clock signal, a change point detection unit 9 for detecting the change point of the signal sampled by the sampling unit 8, namely a point of change to a LOW logic level from a HIGH logic level prior to the point of observation or to a HIGH logic level from a LOW logic level prior to the point of observation, and a same level continuation observation unit 10 for observing whether the changed logic level, after the detection of the change point by the change point detection unit 9, is maintained for a predetermined time. The same level continuation observation unit 10 observes, in case of a change from the HIGH logic level to the LOW logic level, whether the LOW logic level after the change thereto is maintained for the predetermined time, or, in case of a change from the LOW logic level to the HIGH logic level, whether the HIGH logic level after the change thereto is maintained for the predetermined time. It is thus rendered possible to identify whether the aforementioned change in the logic level has resulted from an actual change in the signal or from a noise, because the logic level does not maintain the state after the change for the predetermined time as the high and low logic levels are repeated rapidly in case of a noise.

The same level continuation observation unit 10 is provided with a same level continuation observation time setting unit 11 for setting or changing the predetermined observation time of the same level continuation observation unit 10. It is thus rendered possible to set an appropriately observation time in another system with a different reference clock signal or with a different noise environment, thereby achieving noise elimination more effectively. The noise elimination unit 7 is further provided with a data capture timing generation unit 12 for determining the capture timing for the input signal DATA1 according to the result of the same level continuation observation unit 10, and a latch/hold unit 13 for latching or holding the actually sampled input signal DATA1 according to the result of the data capture timing generation unit 12. The latch/hold unit 13, in case the input signal DATA1 changes and thereafter maintains a same logic level for the predetermined time, latches the sampled data as effective after the lapse of the predetermined time, but, otherwise holds the data of its own by feedback. It is thus rendered possible to prevent easy entry of the noise into the circuits.

In the present embodiment, the change point detection unit 9, the same level continuation observation unit 10 and the data capture timing generation unit 12 are used in common for the input signals DATA1 and DATA2, and such units are not separately provided for the signal DATA2.

In the present embodiment there will be explained a case where the input signal DATA1 is a communication synchronization clock signal, and the input signal DATA2 is a reception data signal transmitted in synchronization with the communication synchronization clock signal. In the present embodiment, the frequency of the reception data (input signal DATA2) is lower than that of the communication synchronization clock signal (input signal DATA1), and the change point in the logic level of the reception data (input signal DATA2) always lies at the downshift of the communication synchronization clock signal (input signal DATA1). Consequently the capture of the reception data (input signal DATA2) at a determined capture timing does not result in an erroneous capture of the reception data (input signal DATA2), by checking the change point of the logic level of the communication synchronization clock signal (input signal DATA1) and accordingly determining the capture timing of the reception data (input signal DATA2).

Also the environment of noise generation is same for the synchronization clock signal (input signal DATA1) and the reception data (input signal DATA2), so that, if a noise is present in either, it is also present in the other. Stated differently, the noise is assumed to be present similarly on both signals at the same time. Therefore, it is rendered possible to obtain the noise-eliminated reception data (input signal DATA2) by determining the capture timing therefor in the sequence for at least eliminating the noise superposed with the communication synchronization clock signal (input signal DATA1). In the foregoing there has been explained a case involving a reception data, but there may be employed plural reception data.

Figure 4:
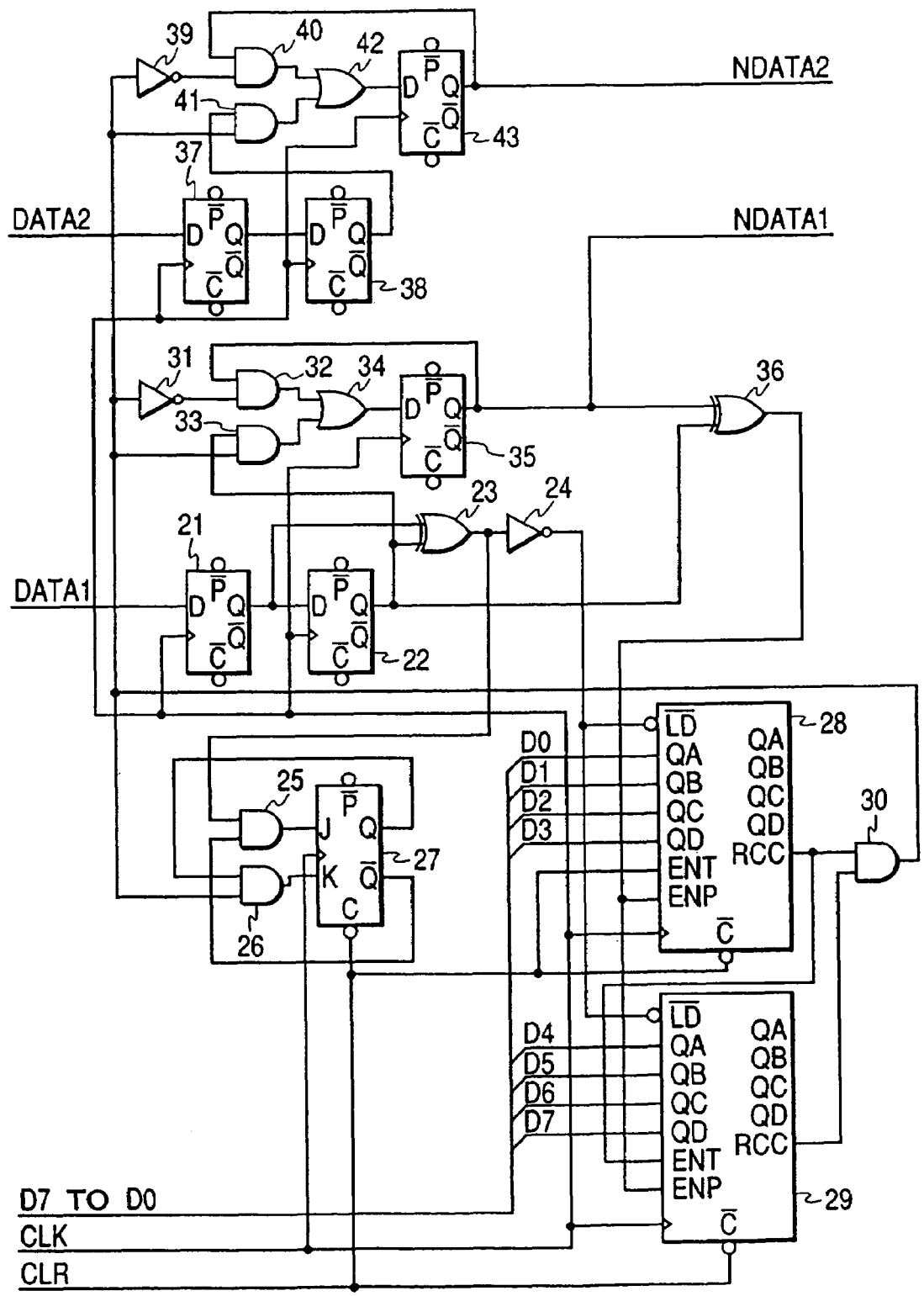
FIG. 4 is a circuit diagram showing the configuration of the noise elimination unit 7.

FIG. 4 is a circuit diagram showing an example of the noise elimination unit 7 shown in FIG. 3. The present example is composed of a synchronization circuit in order to facilitate formation of an LSI. The present example will be explained in a case of the embodiment 2, but a similar circuit can also be applied to the embodiment 1.

In FIG. 4, D latches 21, 22 and D latches 37, 38 are to respectively synchronize input signals DATA1 and DATA2 by a synchronization clock signal CLK for the entire circuit shown in FIG. 4.

An exclusive OR gate 23 and an inverter 24 are used as operation elements for detecting the change point in the logic level, based on the results obtained from the D latches 21, 22. The output of the exclusive OR gate 23 assumes a HIGH logic level in the presence of a change from the prior state, or a LOW logic level in the absence of a change. The output of the inverter 24 is opposite that of the exclusive OR gate 23 and assumes a LOW logic level in the presence of a change from the prior state, or a HIGH logic level in the absence of a change. These signals are used as control signals for a sequencer and a counter to be explained later.

AND gates 25, 26 and a JK latch 27 constitute a sequencer which is the nucleus of the present circuit. 4-bit binary counters 28, 29 can execute counting up to a maximum count of 255, by setting 8-bit data in the ports D0 to D7. A ripple carry detection AND gate 30 is used as an element for detecting the generation of a ripple carry by a counter overflow.

An inverter 31, AND gates 32, 33, an OR gate 34 and a D latch 35 function as a selector for selecting latching and holding, wherein the D latch 35 captures the output of the D latch 22 when the output of the ripple carry detecting AND gate 30 is at the LOW logic level, but captures the output of the D latch 22 by feedback in order to hold the previous value when the aforementioned output is at the HIGH logic level. The output of the D latch 35 constitutes a new noise-eliminated signal NDATA1 (New DATA1). More specifically, the output of the D latch 35 assumes, at a timing where the input signal DATA1 continues a same logic level after a change there in, thus changed logic level of the input signal DATA1 but, in any other timing, maintains the prior logic level. Therefore the change in the logic level takes place only in a timing where the noise is not generated, so that the entry of the noise into the succeeding circuits can be prevented.

The synchronization circuit for the input signal DATA2 consisting of the latches 37, 38 and the selector circuit for selecting latching or holding, consisting of the inverter 39, the AND gates 40, 41, the OR gate 42 and the D latch 43 is provided for capturing the input signal DATA2, and the timing of latching is same as that for the input signal DATA1. Thus the synchronized signal of the input signal DATA2 is captured in case the output of the ripple carry outputting AND gate 30 is at the LOW logic level, but the prior value is held when the aforementioned output is at the HIGH logic level. The output of the D latch 43 constitutes a new noise-eliminated signal NDATA2 (New DATA2).

The output signal of the exclusive OR gate 36 is supplied to ENP input ports of counters 28, 29 in order to cause the counters 28, 29 to count whether a same logic level is continued for the predetermined time after the change in the logic level. This output. signal is constituted by an exclusive OR logic of the finally outputted signal NDATA1 an the synchronized signal of the input signal DATA1. More specifically, the output signal of the exclusive OR gate 36 assumes the HIGH logic level, thereby permitting the count-up operation of the counters 28, 29 in case the currently outputted signal NDATA1 and the input signal DATA1 are at the different logic levels, namely if the input signal DATA1 shows a change and thereafter continues the changed level.

In the following there will be explained the entire control flow, principally based on the and gates 25, 26 and the JK latch 27 constituting the sequencer.

At first a signal CLR is momentarily lowered to the LOW level to reset the latches. In this state, as an input of the AND gate 25 (.at the output of the exclusive OR gate 23) is at the LOW level, the Q output of the latch 27 is at the LOW level. Therefore the Q output of the JK latch 27 is fixed at the LOW level, and the JK latch 27 waits that the output of the exclusive OR gate 23 changes to the HIGH level.

If the logic level of the input signal DATA1 is different from that at an immediately proceeding CLK, such difference is recognized as a change point whereby the exclusive OR gate 23 outputs a HIGH level while the inverter 24 outputs a LOW level. In response the sequencer proceeds to a next step whereby the Q output of the JK latch 27 is changed to HIGH. The values at D0 to D7 are loaded into the counters 28, 29 and the count-up operation is started from the loaded value. The count-up operation is permitted by the output of the exclusive OR gate 36, which outputs a HIGH level thereby giving permission when the logic level of the input DATA1 is changed.

Thereafter the sequence waits that the output of the ripple carry output AND gate 30, constituting an input to the AND gate 26, changes to the HIGH level, namely continues to observe whether the same logic level is continued until the predetermined count-up operation is completed. If the count-up operation is interrupted by a noise, the output of the exclusive OR gate 24 changes to the HIGH level while the output of the inverter 24 changes to the LOW level, whereby the counters reset the values D0 to D7. Thus, the output of the inverter 24, receiving the output of the exclusive OR gate 23, is shifted to the LOW level, whereby the counters are reloaded and restart the count-up operation starting from the predetermined value. In this manner there is observed whether the same logic level is continued for the predetermined time.

Upon counting up the predetermined value, the output of the ripple carry output AND gate 30 whereupon the sequence proceeds to a next step.

Also such upshift of the output of the ripple carry output AND gate 30 to the HIGH level constitutes a permission signal for the AND gates 33, 41, whereby the outputs of the D latches 32, 38 are respectively captured in the D latches 35, 43 (with a level change of the signals NDATA1, NDATA2). In any other timing, the output of the ripple carry output AND gate 30 is at the LOW level, whereby the logic levels of the signals NDATA1, NDATA2 are maintained. Thus the sequencer returns to the original state (where the Q output of the JK latch 27 is at the LOW level), and awaits a next change point. As explained in the foregoing, the circuit shown in FIG. 4 can realize the function of the noise elimination unit 7 (FIG. 3).

Figure 11:
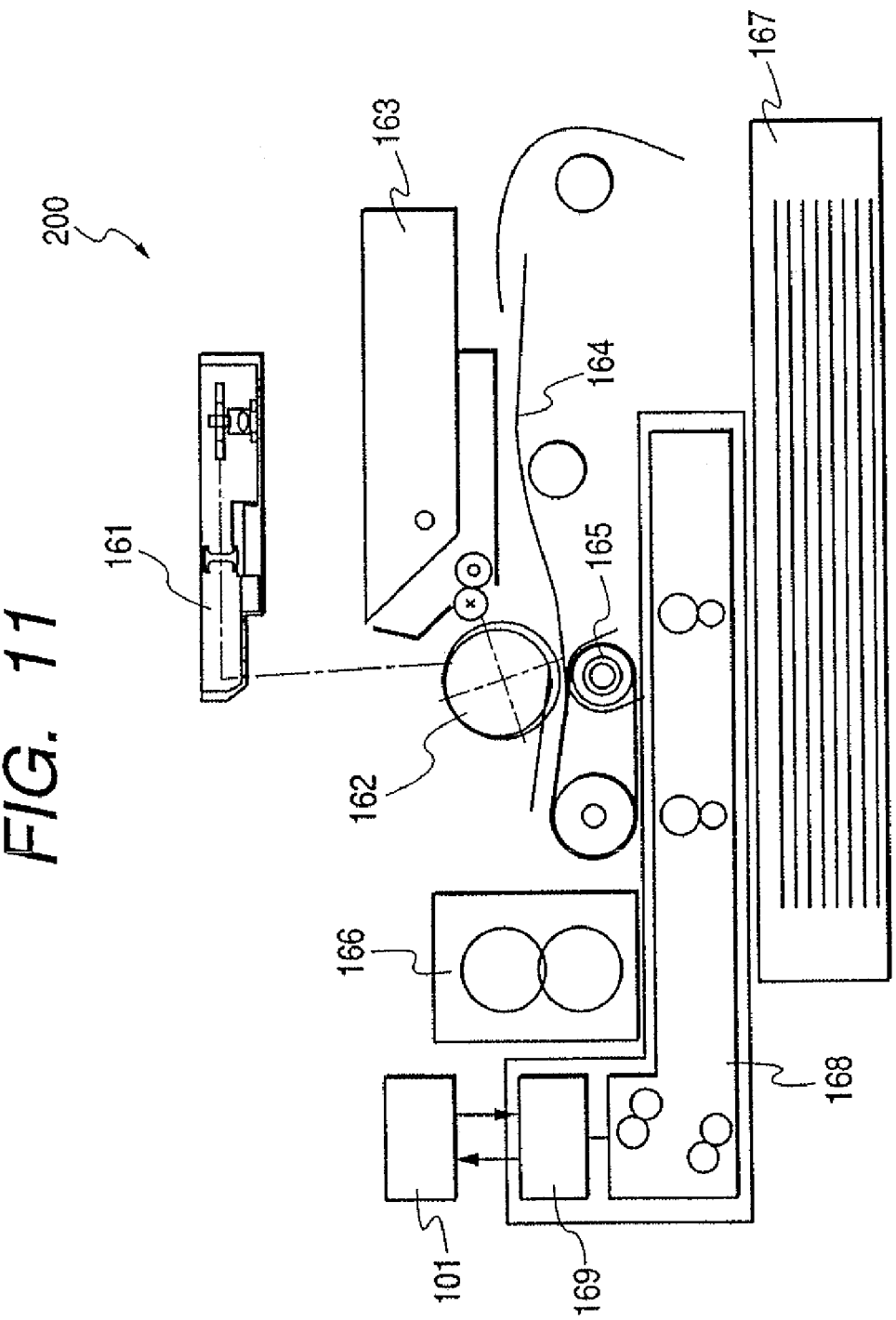
FIG. 11 is a view showing the configuration of an image forming apparatus.
Figure 12:
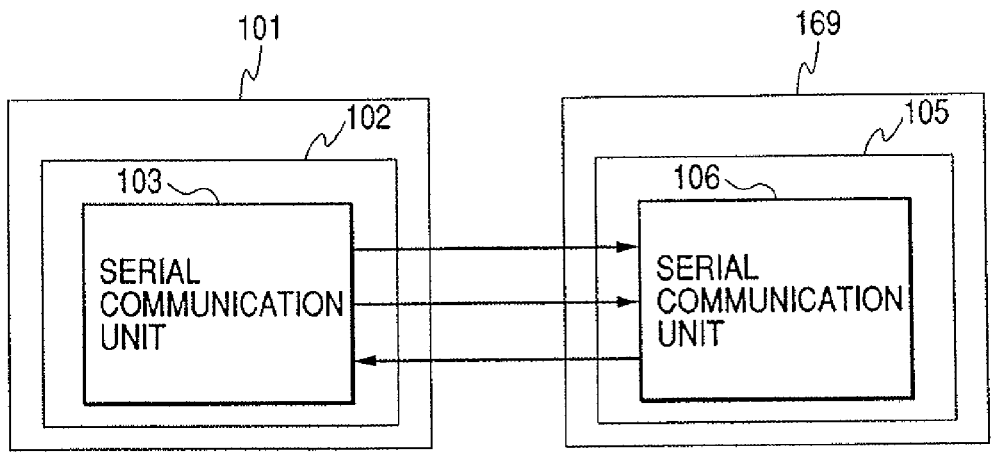
FIG. 12 is a block diagram showing connection by serial communication between an engine control unit 101 and a two-sided unit control unit 169.
Figure 13A:
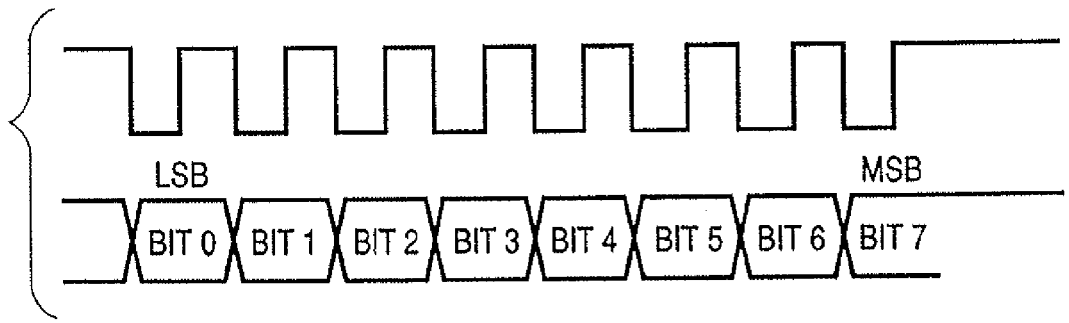
FIG. 13A is a timing chart showing the relationship between a clock signal and a data signal in a clock synchronized serial communication.
Figure 13B:
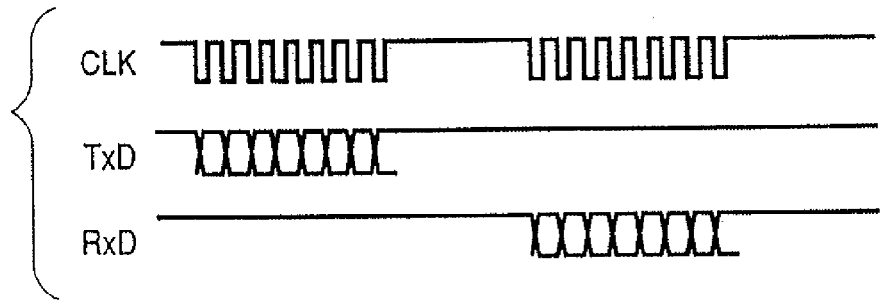
FIG. 13B is a timing chart showing the communication state between a master CPU 102 and a slave CPU 105.
Figure 14:
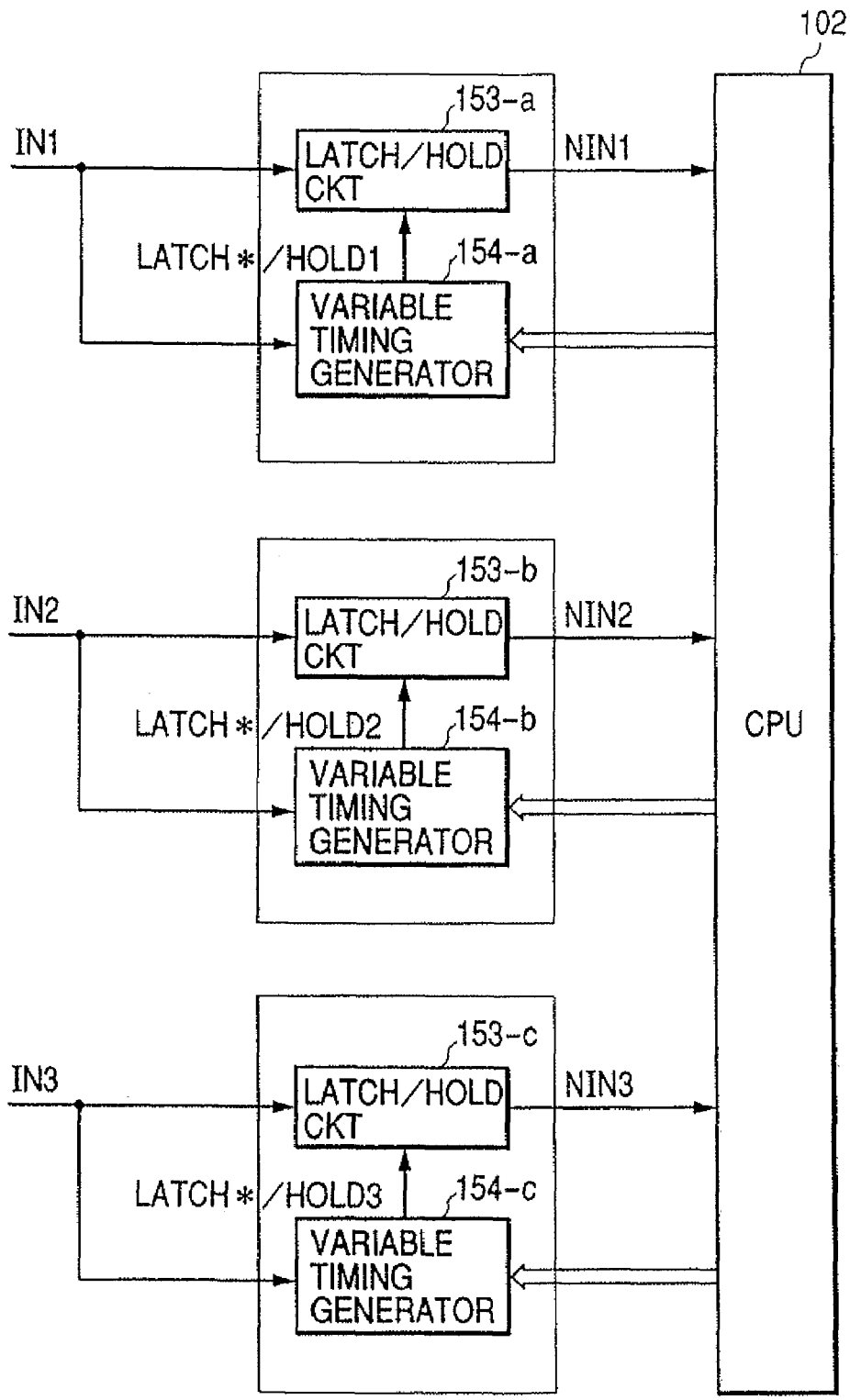
FIG. 14 is a view showing a configuration provided with a plurality of conventional digital noise filters.
Figure 15:
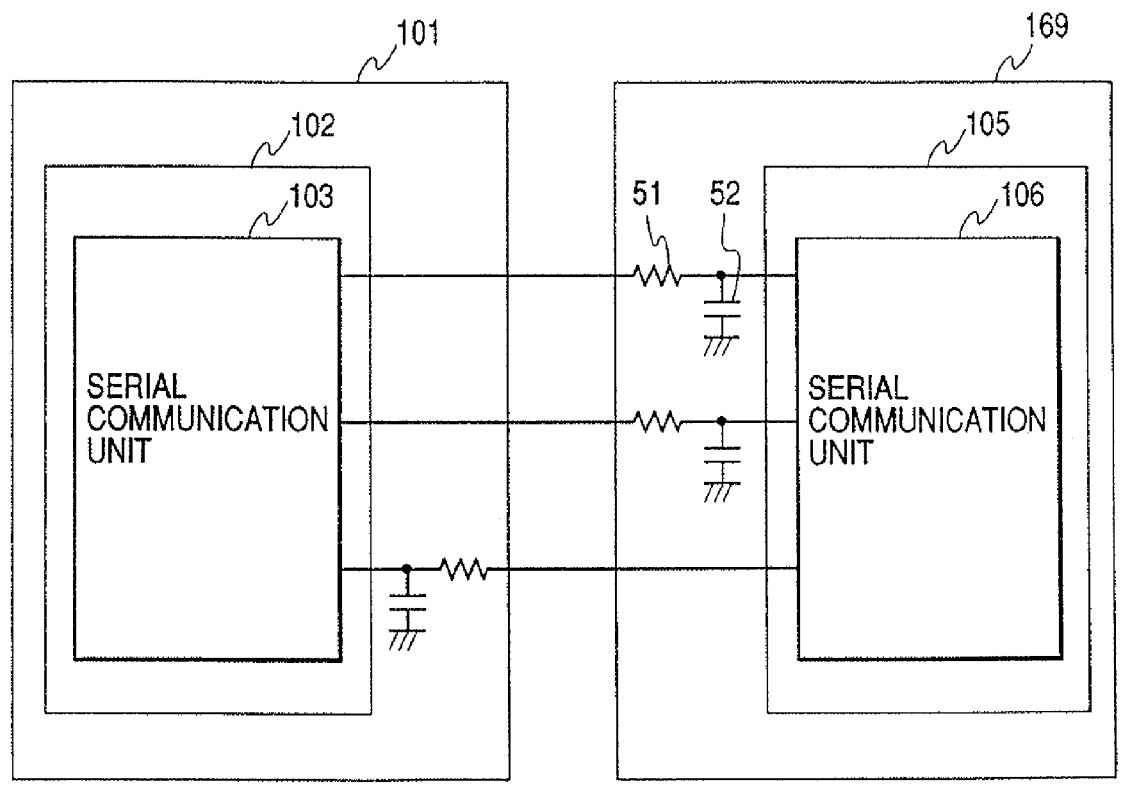
FIG. 15 is a block diagram showing the connection between the engine control unit 101 and the two-sided unit control unit 169 by serial communication.

In the above-described embodiment of the present invention, the noise elimination unit 7 considers the input signal as effective only if the input signal, after a change in the logic level, continues to maintain the changed level for the predetermined time. It is thus possible to securely eliminate the noise without significantly reducing the frequency of the communication clock signal, and also to reduce the magnitude of the circuits since the noise eliminating circuit is not required individually for the plural input signals. The communication apparatus of the foregoing embodiments 1 and 2 can be advantageously applied to the communication between the image forming apparatus and the two-sided unit (or another optional unit such as an MPT (multipurpose tray) or an envelope feeder) as shown in FIGS. 11 and 12. In such case, the above-described noise elimination unit 7 is provided at least on either of the image forming apparatus and the optional unit.

Third Embodiment

Figure 5:
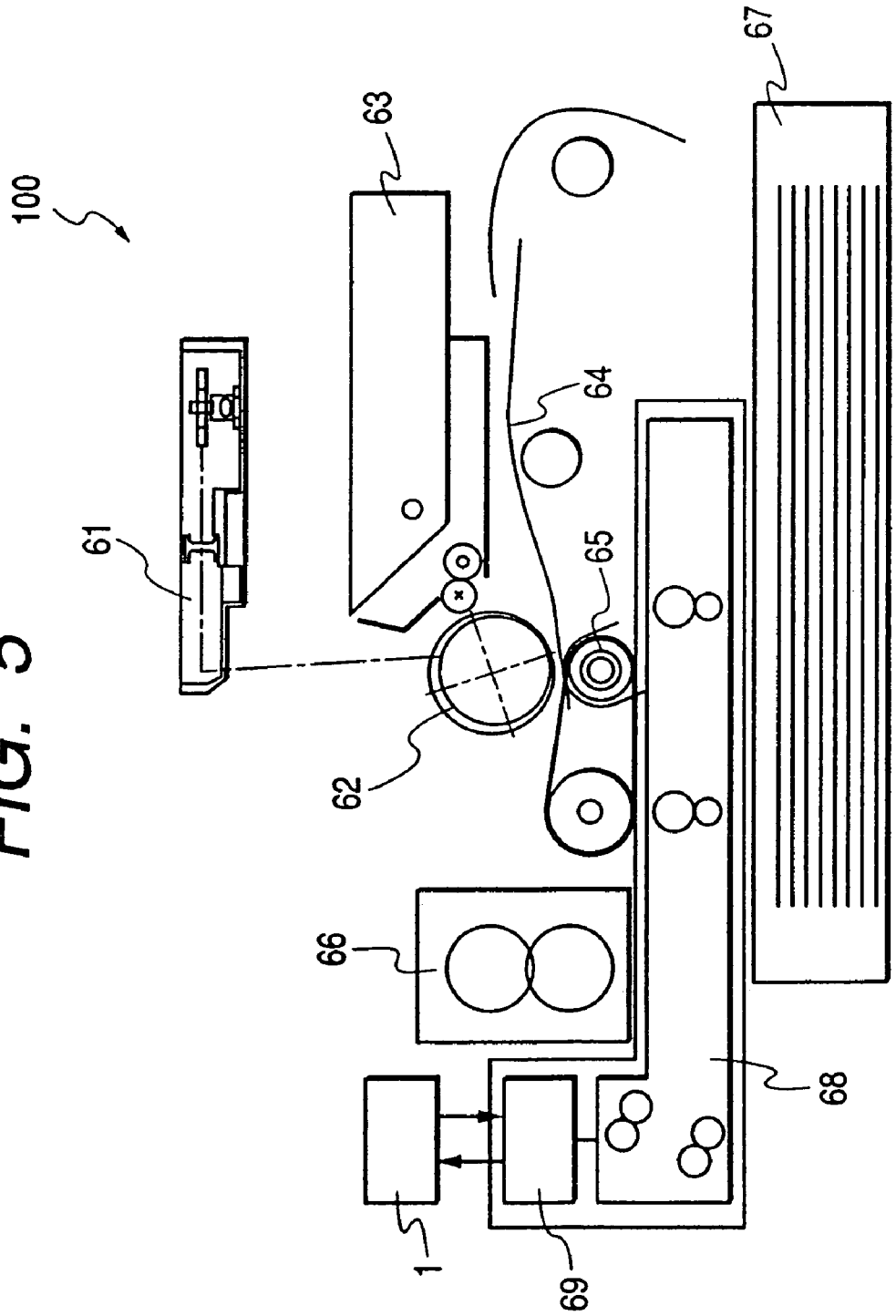
FIG. 5 is a view showing the configuration of an image forming apparatus provided with a noise elimination apparatus for serial communication constituting an embodiment of the present invention.

FIG. 5 is a view showing an example of the configuration of an image forming apparatus provided with a serial communication noise eliminating apparatus in which the present embodiment 3 is applicable.

Referring to FIG. 5, an image forming apparatus 100 is provided with a scanner unit 61 including a light source unit, a cylindrical lens, a scanner motor having a rotary polygon mirror, an imaging lens, a beam detector (BD) etc., a photosensitive member 62 to be exposed to a laser light emitted from the scanner unit 61, a developing unit 63 for developing a latent image formed by exposure of the photosensitive member 62, a transfer belt 65 for transferring an image on a recording sheet 64, a fixing unit 66 for fixing the transferred image to the recording sheet 64, a cassette 67 containing a stack of the recording sheets 64, and an engine control unit 1 for controlling the various units. The laser light emitted from the scanner unit 61 is focused on the photosensitive member 62 provided on a rotary drum. The latent image formed on the photosensitive member 62 by exposure to the laser light is developed into a visible image by the developing unit 63 containing developer. The visible image is transferred to the recording sheet 64, supplied from the cassette 67, on the transfer belt 65, and is subsequently fixed to the recording sheet in the fixing unit 66, and the recording sheet bearing the fixed image is finally discharged to an unrepresented discharge unit.

To the above-described image forming apparatus 100, there can be mounted a two-sided unit 68 enabling two-sided printing on the recording sheet 64, and such two-sided unit is provided with a two-sided unit control unit 69 for controlling the two-sided unit. When a two-sided printing is instructed, the recording sheet 64 after printing on the front surface thereof is guided to the two-sided unit 68, in which the recording sheet 64 is reversed, and is then fed again for printing on the rear surface of the recording sheet 64.

In such operation, the engine control unit 1 and the two-sided unit control unit 69 share the controls through mutual serial communication, and the two-sided unit control unit 69 controls the two-sided unit while the engine control unit 1 executes control of other units.

Figure 6:
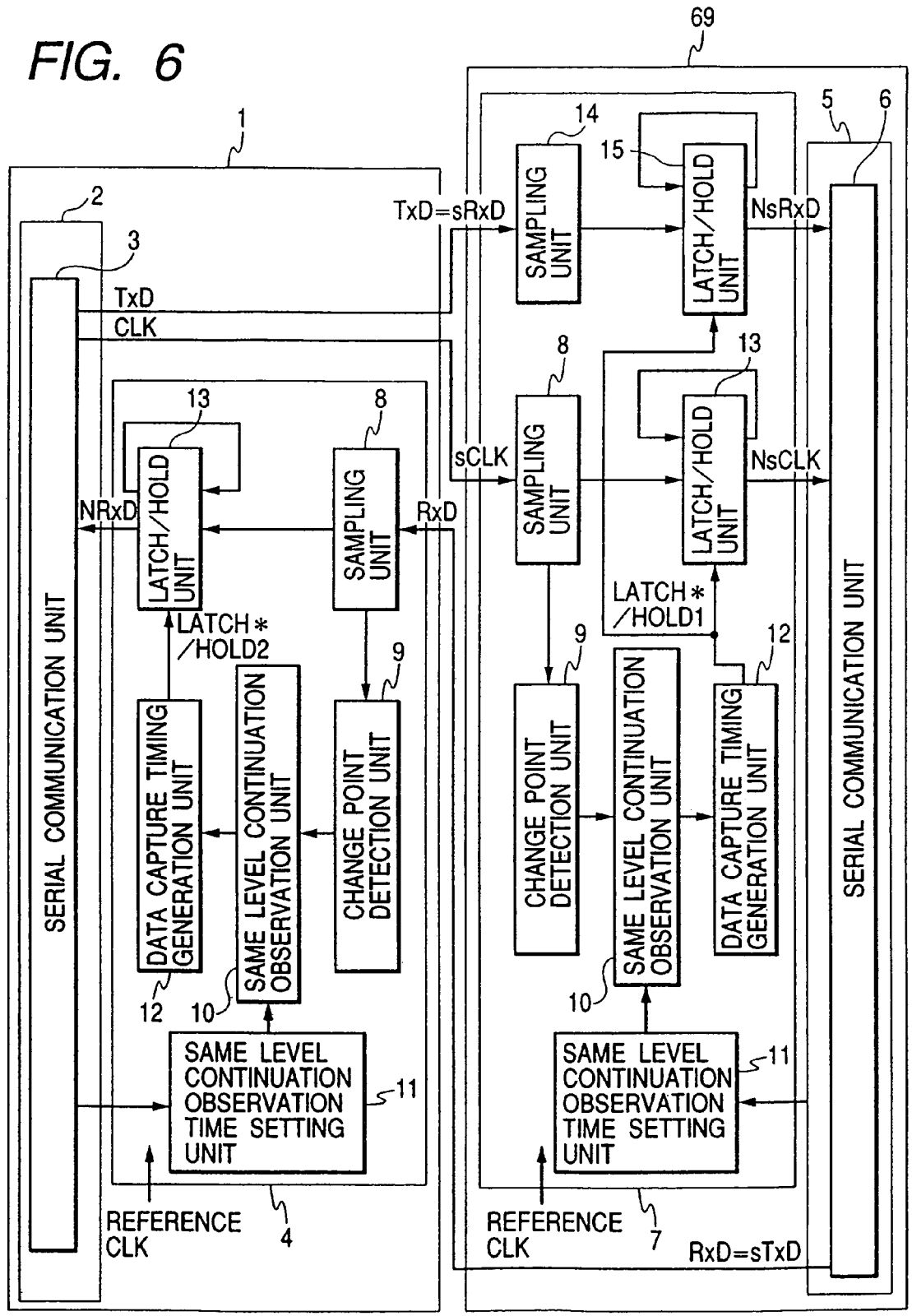
FIG. 6 is a block diagram showing the connection between an engine control unit 1 and a two-sided unit control unit 69 by serial communication.

FIG. 6 is a block diagram showing connection of the engine control unit 1 and the two-sided unit control unit 69 by serial communication. The engine control unit 101 is provided with a master CPU 2 including a serial communication unit 3 for executing clock synchronized communication with the two-sided unit control unit 69 and a noise elimination unit 4 composed of a digital noise filter, while the two-sided unit control unit 69 is provided with a slave CPU 5 including a serial communication unit 6 for executing clock synchronized communication with the engine control unit 101, and a noise elimination unit 7 composed of a digital noise filter. The noise elimination unit 7 is composed of a digital noise filter and is similar in configuration to the noise elimination unit 7 shown in FIG. 3. In FIG. 6, components equivalent to those in FIG. 3 are therefore indicated by same number and will not be explained further. Also the noise elimination unit 4 is partially similar to the noise elimination unit 7, so that the corresponding components of the unit 4 are represented by same numbers as in the unit 7 and will not be explained further.

Figure 7A:
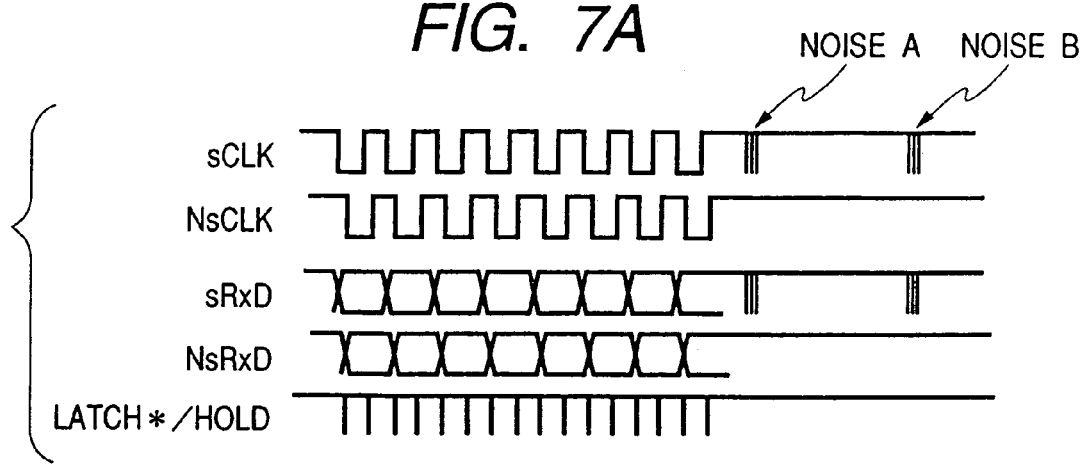
FIG. 7A is a view showing the relationship between a clock signal and data signals in a clock synchronized serial communication in which noises A and B are superposed in a period in which a communication synchronization clock signal is not generated.
Figure 7B:
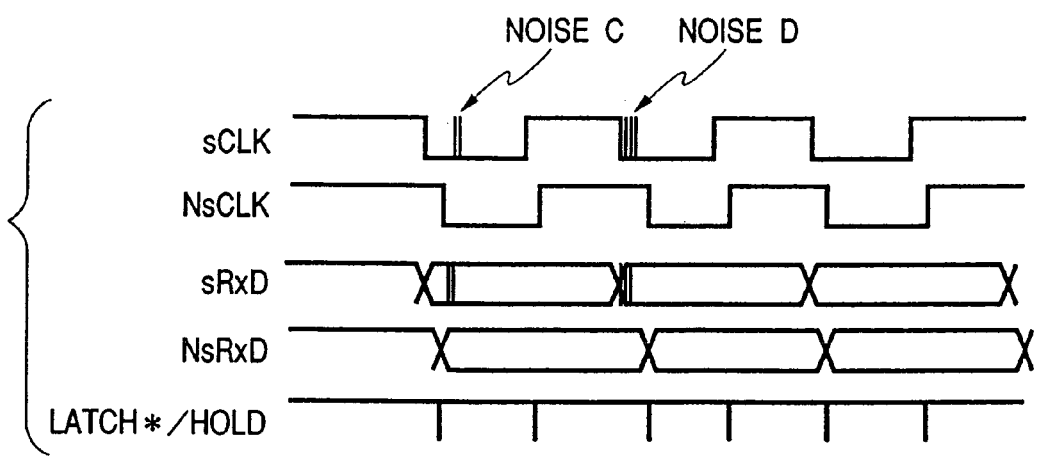
FIG. 7B is a view showing the relationship between a clock signal and data signals in a clock synchronized serial communication in which noises C and D are superposed in a period in which the communication synchronization clock signal is generated.
Figure 7C:
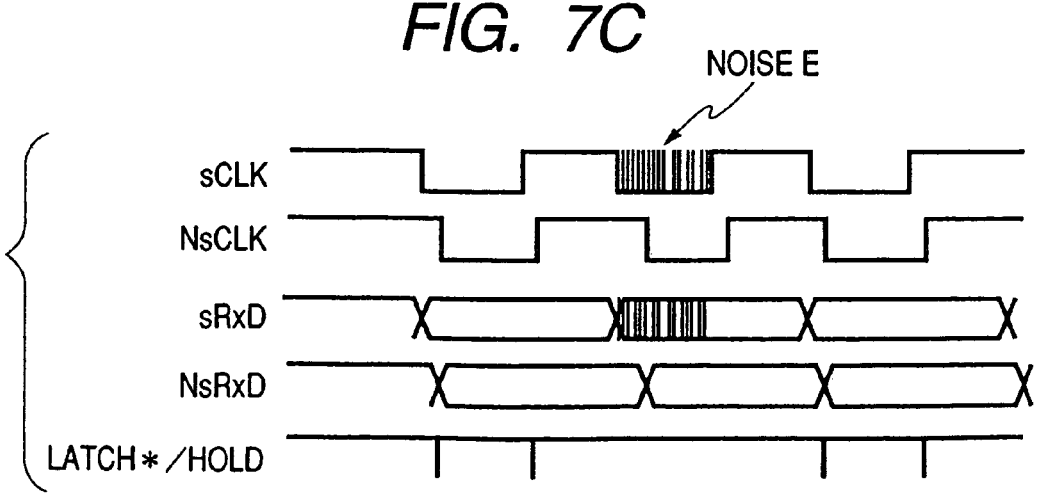
FIG. 7C is a view showing the relationship between a clock signal and data signals in a clock synchronized serial communication in which a noise E is superposed in a period in which the communication synchronization clock signal maintains a same logic level after a change therein.

FIGS. 7A to 7C are views showing the relationship of clock signals and data signals in the clock synchronized serial communication.

In the following there will be explained the function of the configuration shown in FIG. 6, with reference also to FIGS. 7A to 7C. In FIGS. 7A to 7C, a communication synchronization clock signal sCLK is subjected to noise elimination by the noise elimination unit 7 to obtain a communication synchronization clock signal NsCLK. There are also shown a reception data signal sRxD, a reception data signal NsRxD after noise elimination by the noise elimination unit 7, and a signal LATCH*/HOLD for selecting whether to latch, by the latch/hold units 13, 15, a newly sampled input signal obtained by the data capture timing generation unit 12 or to hold the previous state by feedback. At the LOW or HIGH state of the LATCH*/HOLD signal, the latch/hold units 13, 15 respectively latch the newly sampled input signal or hold the previous state by feedback.

FIG. 7A shows a case where noises A, B are superposed in a period where the communication synchronization clock signal sCLK is not generated. In such case, as explained in the foregoing embodiments 1 and 2, the noises A and B are recognized as change points in the logic level, but are eliminated by the noise elimination unit 7 since a same logic level is not continued for the predetermined time (in the communication synchronization clock signal NsCLK and the reception data signal NsRxD).

In the following there will be explained a case with noises C, D as shown in FIG. 7B, in which the noise C occurs immediately after the inversion of the logic level of the communication synchronization clock signal NsCLK. As in the noises A and B shown in FIG. 7A, the noise C is recognized as a change point in the logic level, but is eliminated by the noise elimination unit 7 since a same logic level is not continued for the predetermined time (in the communication synchronization clock signal NsCLK and the reception data signal NsRxD).

The noise D occurs immediately after the inversion of the logic level of the communication synchronization clock signal sCLK. Thus, in case the noise D occurs after the inversion of the logic level of the communication synchronization clock signal sCLK but during the succeeding continued observation during the predetermined time, the noise elimination unit 7 does not invert the logic level of the communication synchronization clock signal NsCLK during the occurrence of the noise D since the same level is not maintained for the predetermined time after the change point of the logic level. At the end of the noise D, there is again recognized the change point in the logic level of the communication synchronization clock signal sCLK, and is then observed whether the same logic level is maintained for the predetermined time, and, after the lapse of the predetermined time, the latch/hold units 13, 15 latch the sampled data (communication synchronization clock signal sCLK after the change) (in the communication synchronization clock-signal NsCLK and the reception data signal NsRxD).

Since the predetermined time of observation is shorter than the half period of the communication synchronization clock signal, there can be achieved secure capture of the input signal with noise elimination, though there is a certain delay in time. However such delay in time becomes no longer negligible, if the duration of the noise becomes longer or the frequency of the synchronization clock signal becomes higher.

In the foregoing there has been explained the operation of data reception by the slave side. In the following there will be explained the operation of data transmission by the slave side.

Figure 8:
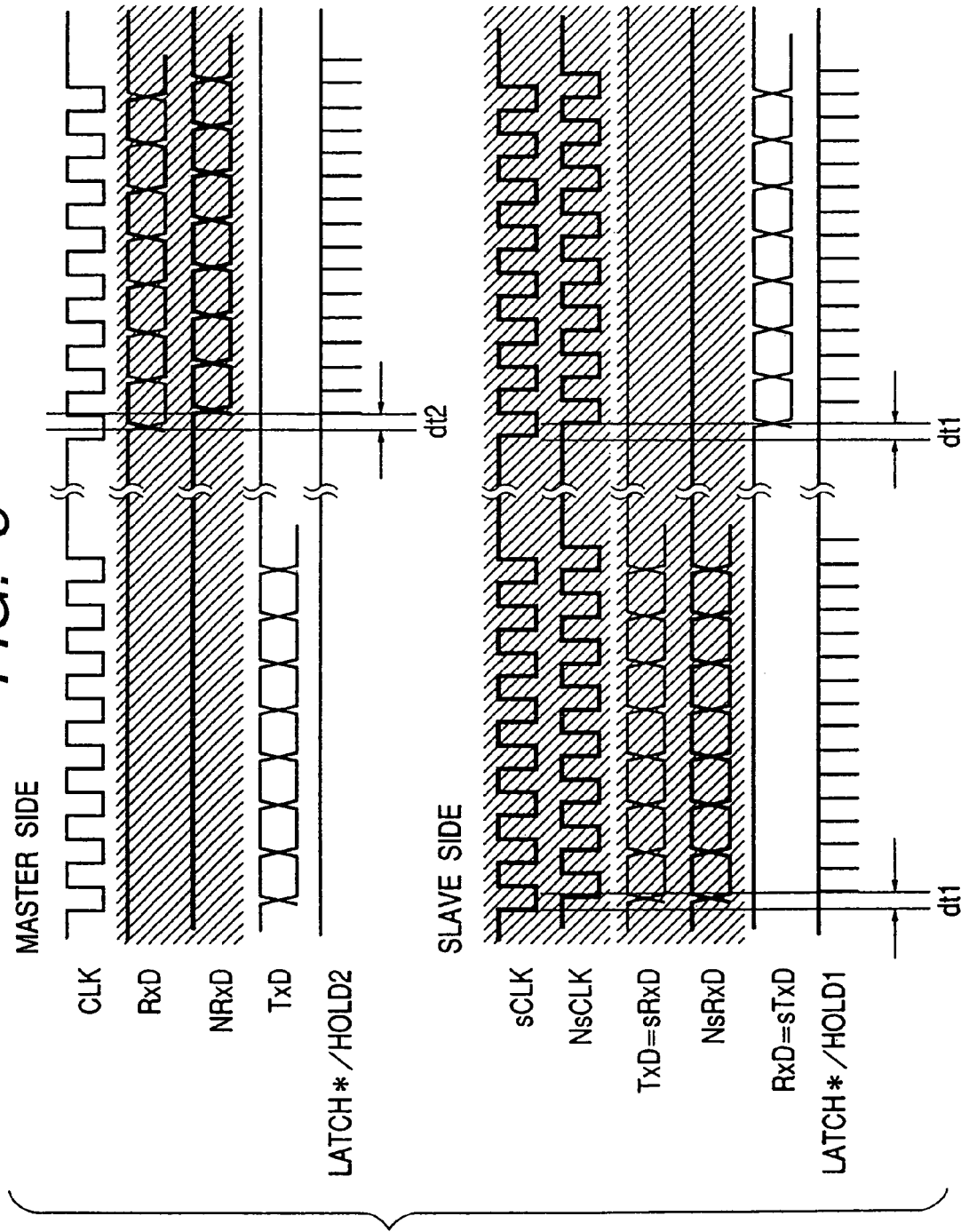
FIG. 8 is a timing chart showing the communication state between a master CPU 2 and a slave CPU 6 in a bidirectional clock synchronized serial communication.

Referring to FIG. 8, the master side transmits a communication synchronization clock signal CLK and a transmission data signal TxD in synchronization with the communication synchronization clock signal CLK. These signals are received as sCLK and sRxD at the slave side. In the slave side, the signals sCLK, sRxD are passed by the noise elimination unit 7 to constitute the signals NsCLK, NsRxD indicated by thicker liners. In succession, the slave side transmits a signal sTxD, in synchronization not with the communication synchronization clock signal CLK but with the noise-eliminated communication synchronization clock signal NsCLK. It is thus possible to avoid transmission of the sTxD signal at an erroneous timing resulting from a noise. The sTxD signals is received at the master side as a signal RxD, which is then passed by the noise elimination unit 4 to constitute a signal NRxD indicated by a thicker line. In the present embodiment, as explained in the foregoing, the data signal sTxD which is basically to be transmitted in synchronization with the received communication synchronization clock signal sCLK is transmitted in synchronization with the communication synchronization clock signal NsCLK which is not necessarily synchronized with the clock signal sCLK.

If the receiving unit of the slave side has a predetermined continuation observation time t1 and that of the master side has a predetermined continuation observation time t2, the noise elimination unit 7 generates a delay at least by t1 in obtaining the noise-eliminated communication synchronization clock signal NsCLK by receiving the communication synchronization clock signal sCLK from the master side. Then the slave CPU 5 transmits the transmission data signal sTxD in synchronization with the communication synchronization clock signal NsCLK which is delayed by t1. When the master CPU 2 receives such data signal sTxD (=RxD), the noise elimination unit 4 generates a delay at least by t2. Therefore, with respect to the communication synchronization clock signal CLK (=sCLK), the reception data signal RxD is delayed by at least t1+t2.

In the present embodiment, the master CPU 2 transmits the data at the downshift of the communication synchronization clock signal CLK, and receives the data signal at the upshift of the communication synchronization clock signal CLK. Therefore, the aforementioned delay t1+t2 has to be accommodated at least in a half cycle period of the communication synchronization clock signal CLK. Stated differently, a condition $t1+t2 \leq T/2$, wherein T is the cycle period of the communication synchronization clock signal.

In case the continuation observation times t1, t2 at the slave and master sides are selected equal (t=t1=t2) in order to increase the noise resistance, there stands a relation $2 \times t \leq T/2$, so that;

$t \leq T/4$.

Consequently, the aforementioned predetermined time for observation has to be equal to or less than ¼ of the period of the communication synchronization clock signal.

Also in consideration of a case where the delay time exceeds the aforementioned time t1 or t2, as in the noise D in FIG. 7B or a delay in the signal transmission, the continuation observation time is preferably about ⅛ of the cycle period of the communication synchronization clock signal. Also, since the master CPU 2 is at least aware of the predetermined time t2 in the noise elimination unit 4, it may receive the noise-eliminated reception data signal NRxD not in synchronization with the communication synchronization clock signal CLK but at a timing obtained by delaying the communication synchronization clock signal CLK by at least the aforementioned predetermined time t2.

FIG. 7C shows a case where a noise E continues while the logic level of the communication synchronization clock signal maintains a same level after a change. In such case, after the change point by the noise is recognized, there cannot be recognized a state of continuation of a same level for the predetermined time, so that the proper data reception cannot be executed. In case of such error, it is possible to include error correction data in the data themselves, thereby causing the CPU's 2, 5 to execute error correction. It is also possible to recognize an error for example by a parity check and to automatically determine the frequency of the communication synchronization clock signal.

Fourth Embodiment

Figure 9:
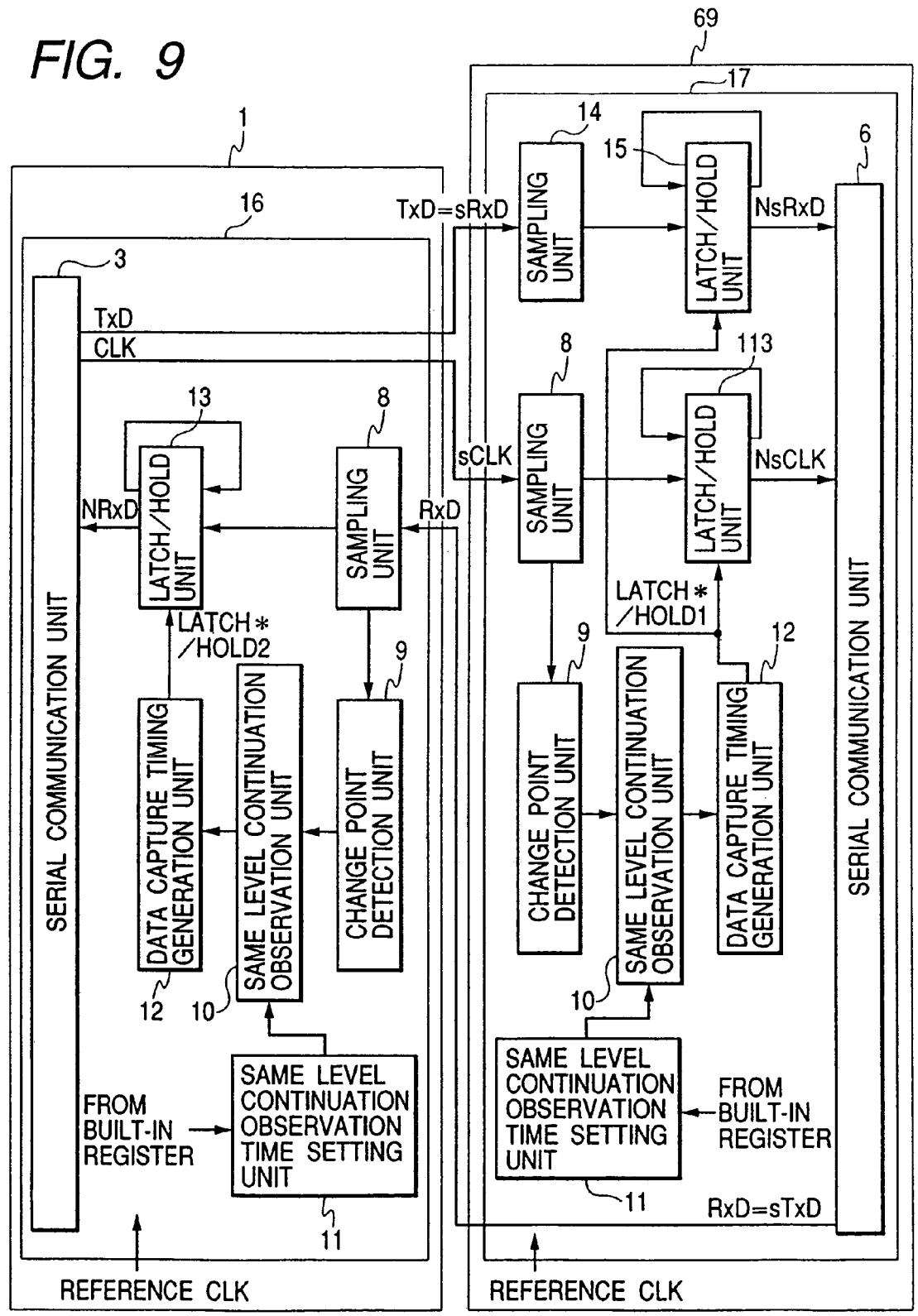
FIG. 9 is a block diagram showing connection by serial communication between an engine control unit 101 and a two-sided unit control unit 169.
Figure 10:
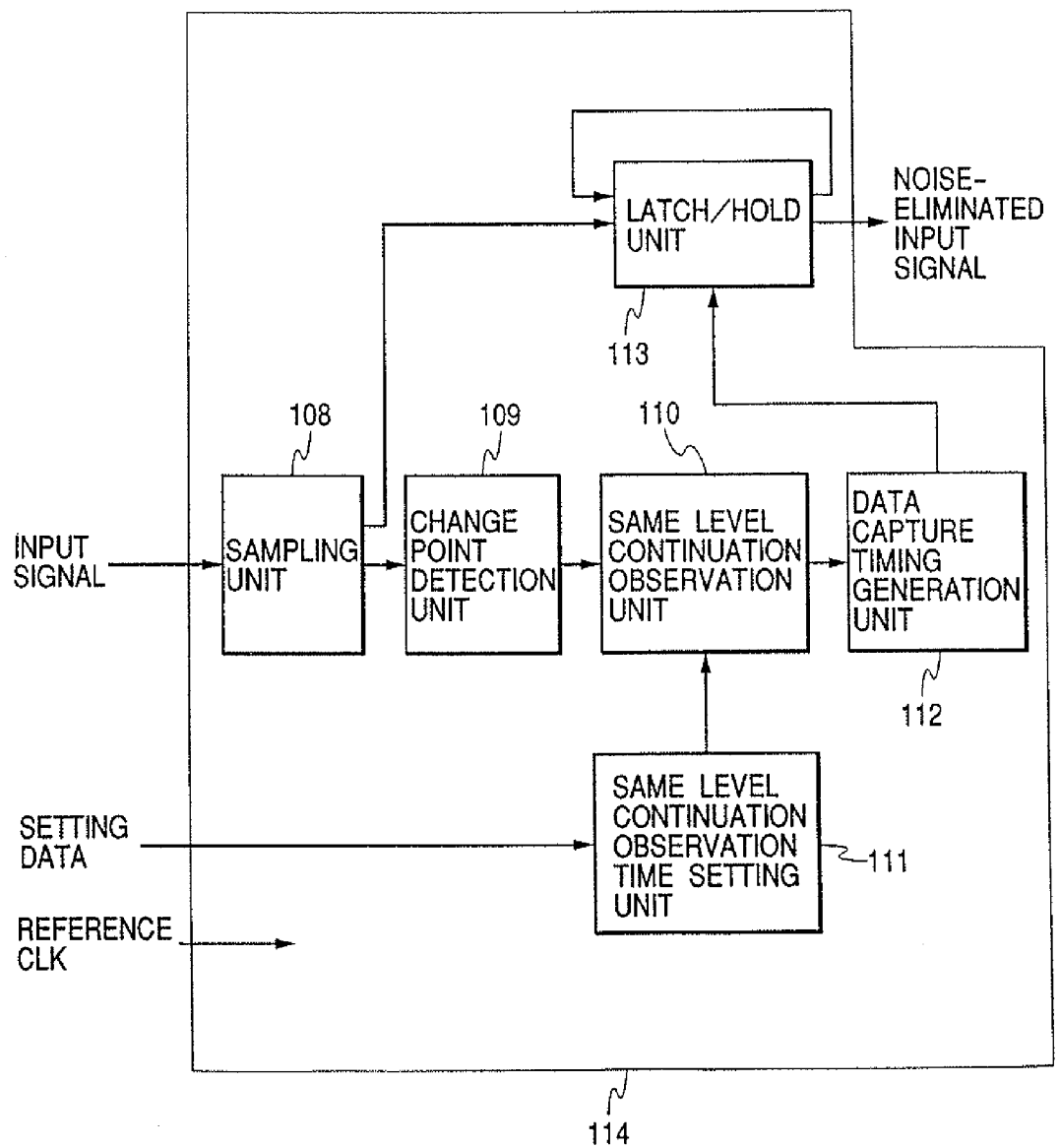
FIG. 10 is a block diagram showing the configuration of a noise elimination unit 114.

FIG. 9 shows a variation of the engine control unit 1 and the two-sided unit control unit 69, wherein shown are a master CPU 16 including a serial communication unit 3 and a noise elimination unit 4 therein, and a slave CPU 17 including a serial communication unit 6 and a noise elimination unit 7 therein.

In the engine control unit 1 and the two-sided unit control unit 69 shown in FIG. 6, the digital noise elimination unit is constructed separately from the CPU, but, in the present variation, the noise elimination unit 4 or 7 is provided inside the CPU to achieve a further cost reduction.

Also time setting pins need not be provided outside the master CPU 16 and the slave CPU 17, by assigning the predetermined time, to be set or changed by the same level continuation observation time setting unit 11, to registers in the master CPU 16 and the slave CPU 17 and by accessing to the specified addresses in such registers, whereby a further cost reduction can be attained.

In the foregoing embodiments 3 and 4, there has been explained bidirectional data communication in synchronization with the communication synchronization clock signal from the master side, but the present invention is also applicable to a case where the communication synchronization clock signal is transmitted from the two-sided unit. Also the foregoing embodiments have been explained by an internal communication between the engine control unit 1 and the two-sided unit 69, but the present invention is not limited to such case and is applicable to the serial communication of various systems, for example with other optional units such as an MPT or an envelope feeder.

As detailedly explained in the foregoing, the noise elimination apparatus as described in the claim 1 and the clock synchronized serial communication apparatus as described in the claim 2 allow, in case of applying a variable digital noise filter to each input unit of plural digital inputs and a first input digital signal has a higher frequency than that of a second digital input signal and in case the change point of the state of the first digital input signal is same as that of the second digital input'signal, to unify the circuit for generating the timing of capturing the signal state by capturing the second digital input signal at the time of capturing the first digital input signal, thereby reducing the magnitude of the circuits.

Also according to the present invention, in the noise elimination apparatus of a type observing the state of the input signal plural times at a predetermined time interval and capturing the signal state only in case, after a change in the signal state, the changed state is maintained for a predetermined time, the aforementioned predetermined time is set equal to or less than ¼ of the cycle period of the communication synchronization clock signal. It is thus no longer necessary to consider the delay in time specific to the digital noise filter, which can thus be utilized as the noise elimination apparatus for serial communication.

The present invention is not limited to the foregoing embodiments and is subject to various modifications and alterations within the scope and spirit of the appended claims.

What is claimed is:

1. A communication apparatus comprising:
a first signal input unit adapted to input a clock signal sent from an external unit;
a second signal input unit adapted to input a data signal sent from the external unit in synchronization with the clock signal;
an observation unit adapted to observe that a level of the clock signal is not changed for a predetermined time period and to output a timing signal when the level of the clock signal is maintained for the predetermined time period,
wherein the predetermined time period is set according to a cycle period of the clock signal;
a first signal capture unit adapted to capture the clock signal according to the timing signal;
a second signal capture unit adapted to capture the data signal sent from the external unit according to the timing signal; and
a data signal transmission unit, adapted to transmit a data signal to the external unit according to the clock signal captured with the first signal capture unit.

2. An apparatus according to claim 1, wherein the predetermined time period is set equal to or less than ¼ of the cycle period of the clock signal.

3. An apparatus according to claim 1, wherein the predetermined time period is variably set according to the cycle period of the clock signal.

4. A communication method for operating a communication apparatus, the method comprising the steps of:
receiving a clock signal sent from an external unit;
receiving a data signal sent from the external unit in synchronization with the clock signal;
observing that a level of the clock signal is not changed for a predetermined time period and outputting a timing signal when the level of the clock signal is maintained for the predetermined time period,
wherein the predetermined time period is set according to a cycle period of the clock signal;
capturing the clock signal according to the timing signal;
capturing the data signal sent from the external unit according to the timing signal; and
transmitting a data signal to the external unit according to the captured clock signal.

5. An option unit connected to an image forming apparatus comprising:
a controller adapted to control an operation of the option unit based on a signal transmitted from the image forming apparatus; and
a noise elimination unit adapted to eliminate a noise from the signal, wherein the noise elimination unit includes:
a first signal input unit adapted to input a clock signal sent from the image forming apparatus;
a second signal input unit adapted to input a data signal sent from the image forming apparatus in synchronization with the clock signal;
an observation unit adapted to observe that a level of the clock signal is not changed for a predetermined time period and to output a timing signal when the level of the clock signal is maintained for the predetermined time period,
wherein the predetermined time period is set according to a cycle period of the clock signal;
a first signal capture unit adapted to capture the clock signal according to the timing signal; and
a second signal capture unit adapted to capture the data signal sent from the image forming apparatus according to the timing signal;
wherein the controller is adapted to transmit a data signal to the image forming apparatus according to the clock signal captured with the first signal capture unit.

6. An option unit according to claim 5, wherein the option unit is one of a two-sided unit, an MPT or an envelope feeder.

* * * * *